Oct. 14, 1924.
J. BATH
ADJUSTABLE GAUGE
Filed Jan. 15, 1920
1,511,934
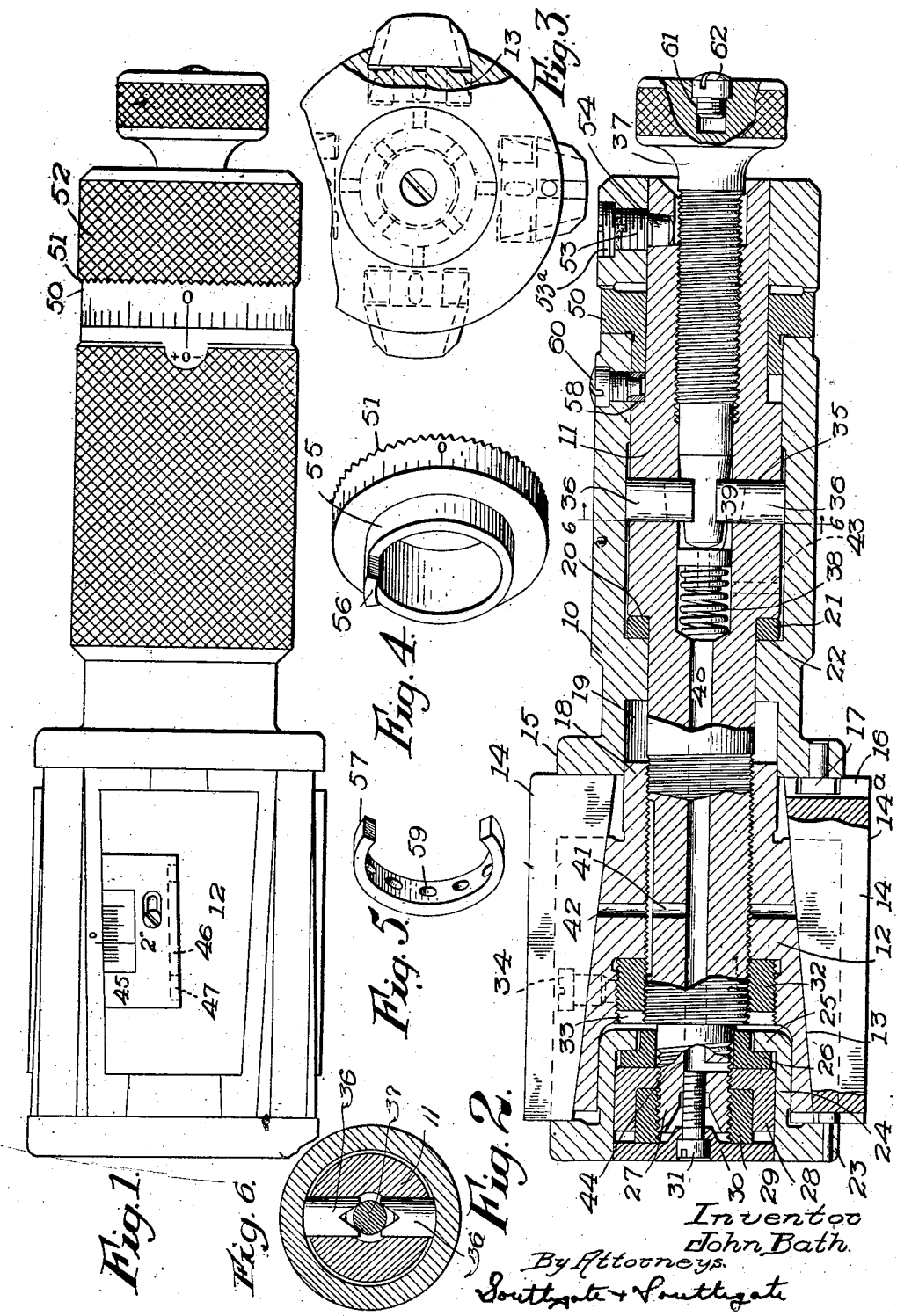
Inventor
John Bath.
By Attorneys.
Southgate & Southgate Patented Oct. 14, 1924.

1,511,934

UNITED STATES PATENT OFFICE.

JOHN BATH, OF WORCESTER, MASSACHUSETTS, ASSIGNOR TO JOHN BATH & CO., INC., OF WORCESTER, MASSACHUSETTS, A CORPORATION OF MASSACHUSETTS.

ADJUSTABLE GAUGE.

Application filed January 15, 1920. Serial No. 351,686.

*To all whom it may concern:*

Be it known that I, JOHN BATH, a citizen of the United States, residing at Worcester, in the county of Worcester and State of Massachusettts, have invented a new and useful Adjustable Gauge, of which the following is a specification.

This invention relates to an adjustable gauge particularly designed for measuring and comparing internal diameters.

It is the general object of my invention to provide an adjustable gauge by which internal measurements may be made with great accuracy. A further object of my invention is to provide a gauge by which variations in diameter from a true circle may be readily indicated.

I also provide means for locking the gauge in any adjusted position and for changing the gauge at will from a freely adjustable gauge to a "go and no-go" gauge having fixed limits of minimum and maximum diameters. Another important object of my invention is to provide an adjustable internal gauge having provision for micrometer readings on a fine scale, in combination with means for adjusting the indicating mechanism to compensate for wear or re-dressing of the gauge bars.

A preferred form of my invention is shown in the drawings, in which

Fig. 1 is a side elevation of my improved gauge;

Fig. 2 is a longitudinal, sectional elevation;

Fig. 3 is a partial end view;

Figs. 4 and 5 are perspective views of detail parts to be described, and

Fig. 6 is a sectional view taken along the line 6—6 in Fig. 2.

Referring to the drawings, my improved gauge comprises a supporting sleeve or casing 10, in which a threaded operating shaft 11 is rotatably mounted. An actuating member or collar 12 is threaded on one end of the shaft 11 and is provided with a plurality of inclined dove-tailed guide ways 13, in which wedge-shaped, dove-tailed contact members or gauge bars 14 are slidably mounted. The guide ways 13 and bars 14 are very carefully finished and the bars have a very close and accurate sliding fit in the guide ways.

At their right hand ends, as viewed in the drawings, the bars 14 abut against a flange 15 on one end of the casing 10. One of the bars, 14$^a$, is provided with a radial slot 16, (Fig. 2) into which projects a key 17 fixed in the flange 15. This key and slot connection permits the bar 14$^a$ to move radially, but absolutely prevents angular movement of the bars or of the collar 12 relative to the casing 10. The collar 12 has a reduced cylindrical extension 18 projecting into a recess 19 in the end of the casing 10, by which construction the thread on the shaft 11 is entirely covered and protected in every position of the collar 12. The shaft 11 is provided with a shoulder 20 engaging one side of a hardened steel collar 21 which, in turn, engages an internal shoulder 22 of the casing 10, thus limiting movement of the shaft 11 to the left.

A disc or flange 23 engages the left-hand ends of the gauge bars 14, and is provided with a cylindrical projection 24 having an internal flange 25 at the right hand end thereof. The disc 23 is preferably of hardened steel and its flange 25 is engaged by a hardened steel collar 26 loose on a reduced threaded portion 27 of the shaft 11. The disc 23 has a pin and slot connection with the gauge bar 14$^a$ similar to the connection between the gauge bar and the flange 15, by which construction, the disc 23 is held from rotation.

A recessed nut 28 is mounted on the threaded portion 27 as is also a lock-nut 29. The nuts 28 and 29 are provided with suitable slots in their outer faces and may be adjusted by means of special screw drivers.

The collar 26 may be moved by means of the nuts 28 and 29 to closely engage the flange 25 while, at the same time, the shoulder 20 of the shaft 11 forces the washer or collar 21 against the shoulder 22 of the casing 10. Axial movement of the shaft 11 relative to the casing 10 is thus prevented and all lost motion avoided. The cylindrical projection 24 covers and protects the outer end of the threaded portion of the shaft 11 in every position of the collar 12.

When it is desired to prevent unauthorized adjustment of the gauge, the recess in the disc 23 surrounding the nuts 28 and 29 may be sealed with wax or other suitable material. A plate 30 may then be secured in the end of the recess by a screw 31 threaded in the shaft 11 at the inner end of a center hole in the threaded portion 27. The plate 30 protects the center hole as well as preserving the adjustment.

A collar 32 is threaded externally to fit a threaded recess in the actuating member 12 and is threaded internally to fit the actuating portion of the shaft 11. This collar 32 is provided with screw driver slots 33 by which it may be adjusted in the member 12 to compensate for wear or back lash between the threads of the member 12 and the shaft 11. A binding screw 34, shown in dotted lines in Fig. 2, preserves the adjustment of the collar 32.

For locking the gauge to hold a desired adjustment, I provide a transverse opening 35 in the shaft 11, within which clamping blocks or plugs 36 are mounted for axial movement, their outer ends engaging an inner surface of the casing 10. The plugs 36 are provided with tapered V-shaped notches at their inner ends and are engaged by the tapered inner end of a clamping screw 37 threaded in an axial opening in the shaft 11. As the screw 37 is turned inward, the blocks or plugs 36 are forced outward and prevent relative angular movement of the shaft and casing. A compression spring 38 is positioned in the inner end of the recess in the shaft 11 and forces a cap 39 against the inner end of the screw 37. The spring 38 assists in preventing undesired rotation of the screw 37 when released from binding position.

I also utilize the recess in the shaft 11 as an oil reservoir, connecting the same by the oil passages 40, 41, 42, 43 and 44 to different parts of the gauge so that oil may be distributed to the several working surfaces thereof.

The mechanism thus far described provides a gauge which may be accurately adjusted and which may be set and held at any desired diameter. I will now describe the construction by which the actual diameter of the gauge is indicated.

One of the gauge bars 14 is provided with an index mark on its side as shown in Fig. 1, which mark cooperates with a graduated index plate 45 mounted for axial adjustment on the cylindrical surface of the actuating member 12. The plate 45 is preferably provided with a short flange 46 slidable in a groove 47 in the member 12, by which it is guided and held from angular displacement. This plate and index cooperate to show the diameter of the gauge, each space on the index plate illustrated representing an increase or decrease of five one-thousandths of an inch in diameter. For sub-dividing this graduation to fractions of thousandths, I provide a zero mark at the right hand end of the casing 10 cooperating with a graduated collar 50 rotatably mounted on the reduced right hand end of the shaft 11. The right hand face of the collar 50 is provided with a series of V-shaped radial notches 51, cooperating with similar notches on the left hand face of a collar 52 also fitting the extension of the shaft 11 and secured in position thereon by a screw 53 having a tapered end 54 fitting a tapered hole in the shaft 11. This screw may be sealed with wax to prevent tampering with the gauge and the opening is then closed by a second screw 53ª.

When the gauge is set to an exact standard size, determined by comparison with any known standard, the collar 50 is rotated to bring the zero thereon in line with the index mark on the casing, and the collar 52 is then placed in position and secured to the shaft 11 by the screw 53. The collar 50 thereafter rotates with the shaft 11 and indicates the changes in diameter of the gauge in ten-thousandths of an inch. If at any time the gauge bars become worn and require re-dressing, the gauge may be again set to standard size and the collar 50 may be again adjusted to zero by temporarily removing the collar 52.

It is sometimes desirable to provide a gauge which may be adjusted only between fixed limits, such a gauge being commonly known as a "go and no-go" gauge, the term indicating that the gauge will enter a hole of the required size when at its minimum limit and will not enter the hole when at the maximum limit. These limits commonly differ only by amounts expressed in fractions of thousandths.

To adapt my improved gauge to such use, I provide a flange 55 (Fig. 4), on the graduated collar 50, said flange having a lug 56 projecting therefrom. I also provide a segmental ring 57 (Fig. 5), adapted to be positioned between the end of the flange 55 and a shoulder 58 on the shaft 11.

The ring 57 is provided with a series of holes 59, into any one of which a locking stud or screw 60 may be inserted. When thus secured, the movement of the shaft 11 in both directions is limited by engagement of the lug 56 with the ends of the segmental ring 57. The opening in the ring 57 may be made of any desired length to correspond to the limits required, and the ring may be adjusted by inserting the screw 60 in different holes 59 to give the required values for the upper and lower readings.

When it is desired to use the gauge as a simple adjustable gauge, it is simply necessary to remove the screw 60, thus permitting the ring 57 to rotate freely with the collar 50. I provide a threaded hole 61 in the end of the locking screw 37 and also provide a short screw 62 corresponding in diameter to the screw 60. When the screw 60 is removed, it is desirable to replace the same by the screw 62, thus preventing the entrance of dirt into the casing 10. The screw 60 may be similarly inserted in the opening 61 to prevent loss of said screw.

Having thus described my improved gauge and the uses and operation thereof, it will be evident that changes and modifications can be made therein by those skilled in the art within the spirit and scope of my invention as set forth in the claims and I do not wish to be otherwise limited to the details herein disclosed, but what I claim is:—

1. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means to hold said shaft in adjusted angular position in said casing, said means comprising a pair of radially movable blocks having notched inner ends, and a longitudinally movable clamping screw having a conical end engaging the notched inner ends of said blocks, to force the same outwards against the inner surface of said casing.

2. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means to indicate the angular position of said shaft relative to said casing, said means comprising a graduated collar angularly adjustable relative to said shaft, a second collar fixed to said shaft, and means to hold said collars in different angular relations to each other.

3. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means to indicate the angular position of said shaft relative to said casing, said means comprising a graduated collar having a plurality of radially disposed notches in one end face, a second collar having cooperating notches in its adjacent face, and means to secure said second collar in fixed position on said shaft.

4. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means permitting only limited angular movement of less than one revolution of said shaft relative to said casing.

5. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means permitting only limited angular movement of said shaft relative to said casing, said means comprising a segmental ring fixed to one of said parts and a member secured to the other part having a projection positioned to engage the ends of said ring as stops when said shaft is moved angularly.

6. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means to limit angular movement of said shaft relative to said casing, said means comprising a segmental ring, means to secure said ring to said casing in any one of a plurality of different angular positions, a member rotatable with said shaft and having a portion engaging said ring, and means to secure said member to said shaft in a selected angular position.

7. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, means to limit angular movement of said shaft relative to said casing, and a device effective to render said means operative or inoperative at will.

8. An adjustable gauge comprising a casing, a threaded shaft rotatable therein, an actuating member threaded on said shaft and longitudinally movable thereby, and a plurality of gauge bars movable radially by said member, said member and gauge bars having engaging surfaces disposed at a relatively slight inclination to the axis of said shaft, said shaft having an oil reservoir therein connected by suitable passages to lubricate the bearing surfaces of said gauge.

9. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, means to prevent angular movement of said gauge bars, a disc engaging the outer ends of said bars and having an internally flanged projection encircling said shaft, a bearing collar slidable on said shaft, and engaging the flange portion of said disc, and adjusting and locking nuts for said collar.

10. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, means to prevent angular movement of said gauge bars, a disc engaging the outer ends of said bars and having an internally flanged projection encircling said shaft, a collar slidable on said shaft, and engaging the flange portion of said disc, adjusting and lock nuts for said collar, and means to cover and protect said lock nuts and the adjacent end of said shaft.

11. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, and means to indicate the diameter of said gauge, said means comprising a scale longitudinally movable of said gauge and a co-operating index mounted in fixed longitudinal position in said gauge to indicate larger diameter divisions, and also a scale angularly movable relative to said casing and a co-operating index fixed relatively to said casing to indicate smaller diameter divisions.

12. An adjustable gauge comprising a casing, a threaded shaft rotatable therein, an actuating member threaded on said shaft and longitudinally movable thereby, a plurality of gauge bars movable radially by said member, said member and gauge bars having engaging surfaces disposed at a relatively slight inclination to the axis of said shaft, means to prevent angular movement of said gauge bars, a disc engaging the outer ends of said bars and having an internally flanged projection encircling said shaft, a bearing collar slidable on said shaft, and engaging the flange portion of said disc, and adjusting and locking nuts for said collar, said member being recessed at its outer end, and said projection extending into said recess and protecting the outer threaded portion of said shaft in all positions of said member.

13. An adjustable gauge comprising a casing, a threaded shaft rotatable therein, an actuating member threaded on said shaft and longitudinally movable thereby, said member having a recess in its outer end, a plurality of gauge bars movable radially by said member, said member and gauge bars having engaging surfaces disposed at a relatively slight inclination to the axis of said shaft, means to prevent angular movement of said gauge bars relative to said casing, a disc engaging the outer end of said bars and having an internally flanged projection encircling said shaft, a collar slidable on said shaft, and engaging the flange portion of said disc, adjusting and lock nuts for said collar, and means to cover and protect said lock nuts and the adjacent end of said shaft, said collar, nuts and cover being disposed within the cylindrical projection of said disc, and said projection extending into the recess in the outer end of said member in every position thereof.

In testimony whereof I have hereunto affixed my signature.

JOHN BATH.